United States Patent [19]
Fujita

[11] Patent Number: 6,161,069
[45] Date of Patent: Dec. 12, 2000

[54] POWER STEERING APPARATUS

[75] Inventor: Kazuhiko Fujita, Kashihara, Japan

[73] Assignee: Koyo Seiko Co., Ltd., Osaka, Japan

[21] Appl. No.: 09/431,187

[22] Filed: Nov. 1, 1999

[30] Foreign Application Priority Data

Nov. 4, 1998 [JP] Japan .................................. 10-313376

[51] Int. Cl.[7] .................................................. B62D 5/00
[52] U.S. Cl. ............................................. 701/41; 180/446
[58] Field of Search .................................. 701/41, 42, 43, 701/44; 180/443, 444, 445, 446

[56] References Cited

U.S. PATENT DOCUMENTS

| | | | |
|---|---|---|---|
| 4,611,682 | 9/1986 | Yasuda et al. | 180/446 |
| 4,771,845 | 9/1988 | Shimizu | 180/446 |
| 4,789,040 | 12/1988 | Morishita et al. | 180/446 |
| 4,800,974 | 1/1989 | Wand et al. | 180/446 |
| 5,103,926 | 4/1992 | Ohno et al. | 180/446 |
| 5,925,995 | 7/1999 | Yoshida et al. | 318/434 |

*Primary Examiner*—Michael J. Zanelli
*Assistant Examiner*—Eric M. Gibson
*Attorney, Agent, or Firm*—Rabin & Champagne, P.C.

[57] ABSTRACT

A power steering apparatus according to the present invention, when an electric motor M is actuated, senses an electric current flowing through the electric motor, then determines a temperature rise value with respect to an oil temperature as a time-based sum of temperature increase rates each corresponding to the amount of heat generated in a driver element (31) per unit time by the electric current, and estimates the oil temperature on the basis of the temperature rise value and the temperature of the driver element (31). Thus, the oil temperature can be estimated without the use of an oil temperature sensor. This allows for motor actuation even at an extremely low temperature.

2 Claims, 5 Drawing Sheets

POWER STEERING APPARATUS

This application is based on Patent Application No. 10-313376 filed in Japan, the content of which is incorporated thereinto by reference.

TECHNICAL FIELD

The present invention relates to a power steering apparatus and, more particularly, to a so-called motor-driven hydraulic power steering apparatus which is adapted to generate a hydraulic pressure by driving an oil pump by an electric motor to assist a steering operation by the generated hydraulic pressure.

BACKGROUND ART

Motor-driven hydraulic power steering apparatuses are conventionally known which are adapted to rotate an oil pump by an electric motor and supply a working oil to a power cylinder from the oil pump to mitigate an operation force required for operating a steering wheel.

In a power steering apparatus of this type, the electric motor is generally driven to provide steering assist only when the steering operation is performed.

The power steering apparatus is provided with means for inputting a temperature detection signal indicative of the temperature of a motor driver element to protect the driver element.

Since an oil-cooling system is typically employed for cooling the driver element, it is expected that there is a certain relationship between the temperature of the driver element and the temperature of the oil. If the oil temperature can be estimated on the basis of the temperature of the driver element, the determination of the oil temperature can be achieved without the provision of an oil temperature sensor.

Where a plurality of motor driver elements are provided, the respective elements have different temperature increase rates and, therefore, a temperature sensor is attached to each of the elements. Accordingly, a plurality of temperature sensors are required, thereby complicating the construction of the power steering apparatus.

DISCLOSURE OF THE INVENTION

It is an object of the present invention to provide a power steering apparatus which is capable of estimating an oil temperature directly without the use of an oil temperature sensor.

It is another object of the present invention to provide a power steering apparatus which has a motor driving circuit including a plurality of elements only one of which is provided with a temperature sensor to estimate the temperatures of the other elements for protection of the respective elements.

In accordance with one aspect of the present invention to achieve the aforesaid objects, there is provided a power steering apparatus which comprises: temperature sensing means for sensing a temperature of a driver element operative for driving an electric motor; electric current sensing means for sensing an electric current flowing through the electric motor; storage means for storing therein a relationship between the electric current flowing through the electric motor and a temperature increase rate which corresponds to the amount of heat generated in the driver element per unit time by the electric current; and computing means for determining a temperature rise value with respect to an oil temperature as a sum of temperature increase rates each determined with respect to the electric current sensed by the electric current sensing means on the basis of the relationship stored in the storage means, and estimating the oil temperature on the basis of the determined temperature rise value and the temperature of the driver element sensed by the temperature sensing means (claim 1).

In accordance with the invention, when the electric motor is actuated, the electric current of the electric motor is sensed, and the temperature rise value with respect to the oil temperature is determined as the time-based sum of the temperature increase rates each corresponding to the amount of the heat generated in the driver element per unit time by the electric current and determined on the basis of the relational data. Thus, the oil temperature can be estimated on the basis of the temperature rise value and the temperature of the driver element.

Where the working oil has a high viscosity resistance at a low oil temperature, for example, the oil pump is operated at a higher speed on the basis of the estimated oil temperature to raise the oil temperature in a shorter time than in the case where the working oil has a low viscosity resistance at a high oil temperature.

That is, the oil temperature can be estimated without the use of an oil temperature sensor, and the motor can be actuated even at an extremely low temperature.

In accordance with another aspect of the present invention, there is provided a power steering apparatus which comprises: temperature sensing means for sensing a temperature of one of a plurality of elements in an electric motor driving circuit or a temperature of an ambience; electric current sensing means for sensing an electric current flowing through an electric motor; storage means for storing therein relationships between the electric current flowing through the electric motor and temperature increase rates which correspond to the amounts of heat generated in the respective elements per unit time by the electric current; computing means for determining temperature rise values of the respective elements as sums of temperature increase rates each determined with respect to the electric current sensed by the electric current sensing means on the basis of the relationships stored in the storage means, and estimating temperatures of the respective elements on the basis of the determined temperature rise values and the temperature sensed by the temperature sensing means; and element protecting means for protecting the respective elements on the basis of the temperatures of the respective elements estimated by the computing means (claim 2).

The term "ambience" herein means an object which is kept in common thermal contact with the respective elements.

In accordance with the invention, the electric current of the electric motor is sensed, and the temperature rise values with respect to the ambience are determined as the time-based sums of the temperature increase rates which correspond to the amounts of the heat generated in the respective elements per unit time by the electric current on the basis of the relational data.

Where the temperature sensing means is adapted to sense the temperature of one of the elements, a temperature difference between the one element and the ambience as well as temperature differences between the other elements and the ambience can be determined on the basis of the sensed temperature of the one element. Consequently, the temperatures of the respective elements can be estimated.

Where the temperature sensing means is adapted to sense the temperature of the ambience, the temperature differences between the respective elements and the ambience can be determined on the basis of the sensed temperature of the ambience. Thus, the temperatures of the respective elements can be estimated.

Therefore, the protection of the respective elements can be based on the estimated temperatures of the respective elements.

BRIEF DESCRIPTION OF THE DRAWINGS

FIG. 4 is a diagram illustrating electrical interconnection of an electronic control unit ECU and the like.

BEST MODE FOR IMPLEMENTATION OF THE INVENTION

Figure 1:
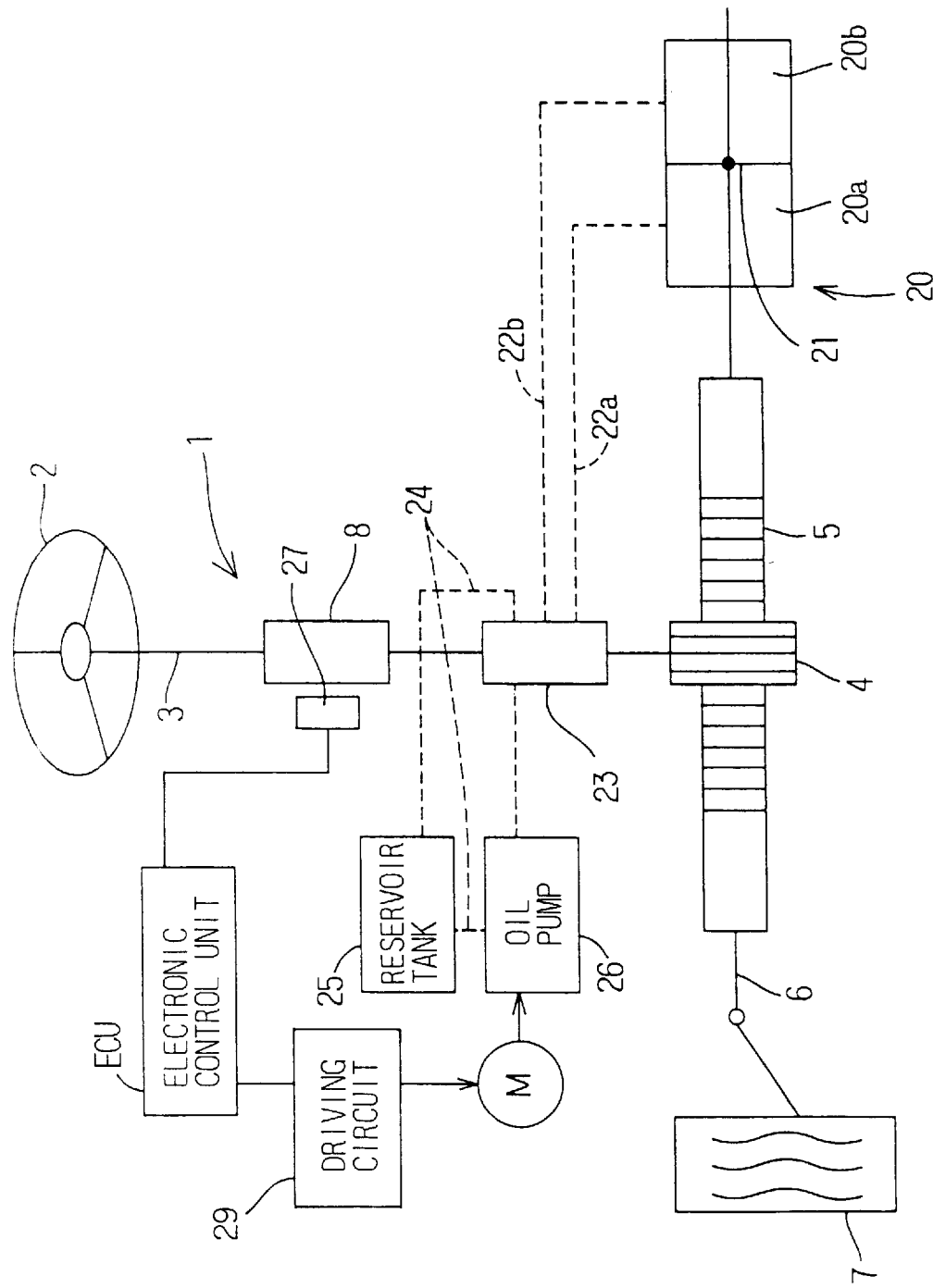
FIG. 1 is a schematic diagram illustrating the overall construction of a power steering apparatus according to one embodiment of the present invention.

FIG. 1 is a schematic diagram illustrating the overall construction of a power steering apparatus according to one embodiment of the present invention. The power steering apparatus is incorporated in a motor vehicle and adapted to assist a steering operation of a steering mechanism 1.

The steering mechanism 1 includes a steering wheel 2. A steering shaft 3 is coupled to the steering wheel 2, and a pinion gear 4 is attached to the distal end of the steering shaft 3. The pinion gear 4 is meshed with a rack gear 5 which extends transversely of the vehicle. Front tires 7 are attached to the rack gear 5 via tie rods 6.

When the steering wheel 2 is operated and a torque applied thereto is transmitted to the steering shaft 3, the pinion gear 4 provided at the distal end of the steering shaft is rotated, so that the rack gear 5 is moved transversely of the vehicle. As a result, the movement of the rack gear 5 is transmitted to the tie rods 6 to change the orientation of the front tires 7.

The power steering apparatus further includes a power cylinder 20 for generating a steering assist force. The power cylinder 20 includes a piston 21 coupled to the rack shaft 5, and a pair of cylinder chambers 20a, 20b split by the piston 21. A hydraulic pressure control valve 23 is connected to the cylinder chambers 20a, 20b via oil supply lines 22a, 22b indicated by broken lines.

The hydraulic pressure control valve 23 is interposed in an oil circulation line 24 indicated by a broken line. Through the oil circulation line 24, a working oil contained in a reservoir tank 25 is pumped up by an oil pump 26, then discharged from the oil pump 26, and returned into the reservoir tank 25.

The oil pump 26 is driven and controlled by an electric motor M. When the oil pump 26 is driven by the electric motor M, the working oil is circulated through the oil circulation line 24. With the oil pump being off, the circulation of the working oil is suspended.

A torque sensor 27 is provided in association with a torsion bar 8 attached to the steering shaft 3, and outputs a torque signal having a value proportional to the magnitude of a torque applied to the steering shaft 3 and a sign corresponding to the direction of the torque. A torque sensor of any type such as a potentiometer having a mechanical contact or a non-contact torque sensor may be employed as the torque sensor 27.

The hydraulic pressure control valve 23 is adapted to change its valve aperture in accordance with the direction and magnitude of the torque applied to the steering shaft 3 so that the supply of the working oil to the power cylinder 20 can be varied.

When the working oil is supplied to either of the cylinder chambers of the power cylinder 20, the piston 21 is moved in a corresponding direction transversely of the vehicle. Thus, a steering force is generated to assist the movement of the rack shaft 5.

Figure 2:
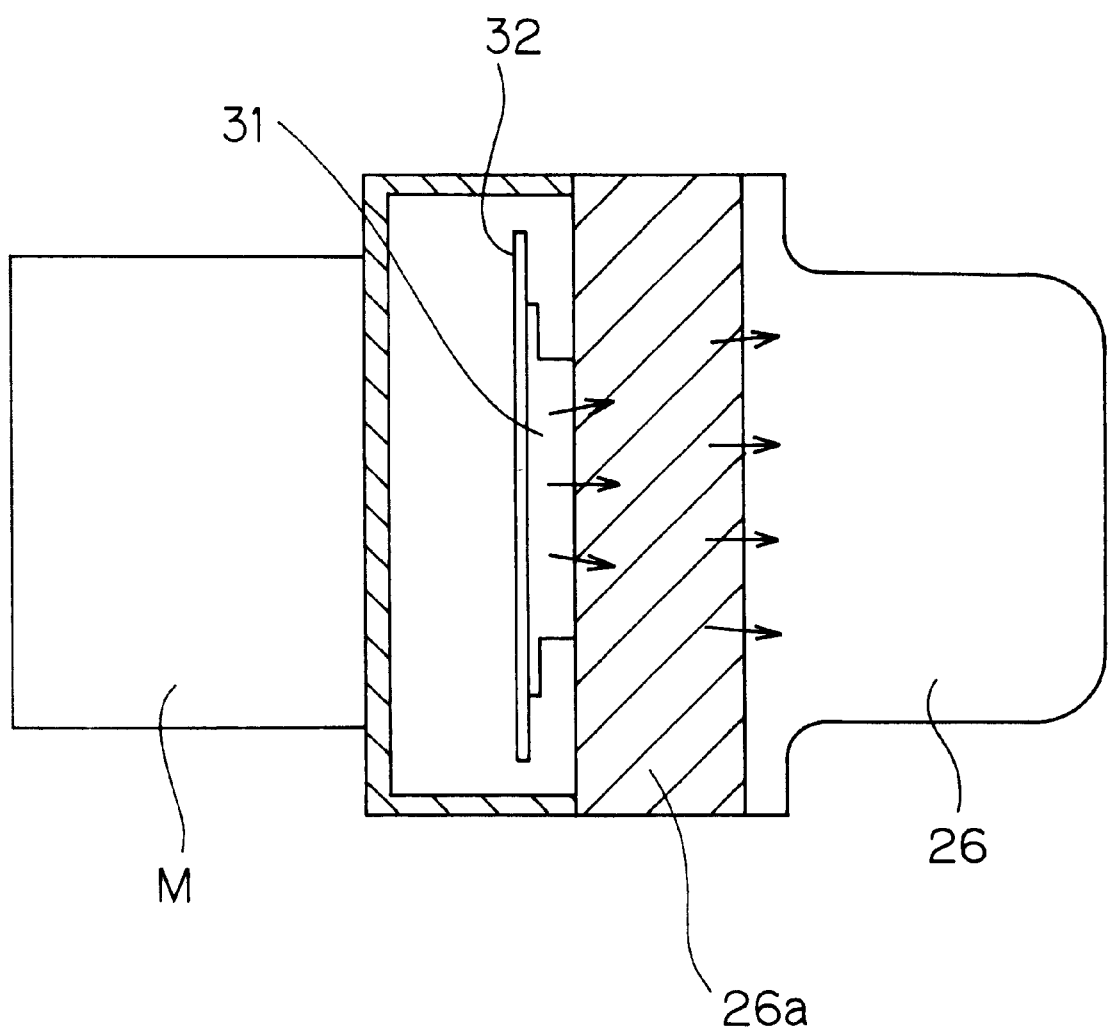
FIG. 2 is a partial sectional view for explaining an oil-cooling system including an electric motor M and an oil pump 26 integrated therewith.

FIG. 2 is a partial sectional view for explaining an oil-cooling system including the electric motor M and the oil pump 26 integrated therewith. A board 32 of an electronic control unit ECU including a driver element 31 is provided in a housing of the electric motor M. A heat sink 26a of a metal is attached to the oil pump 26. The driver element 31 is connected directly to the heat sink 26a with the board 32 of the electronic control unit ECU being rested thereon.

Heat generated by the driver element 31 is diffused through the heat sink 26a and conducted to the working oil within the oil pump 26 as indicated by arrows in FIG. 2.

The electronic control unit ECU includes a microprocessor having a CPU, a ROM and a RAM, and controls a driving circuit 29 for driving the electric motor M.

Figure 3:
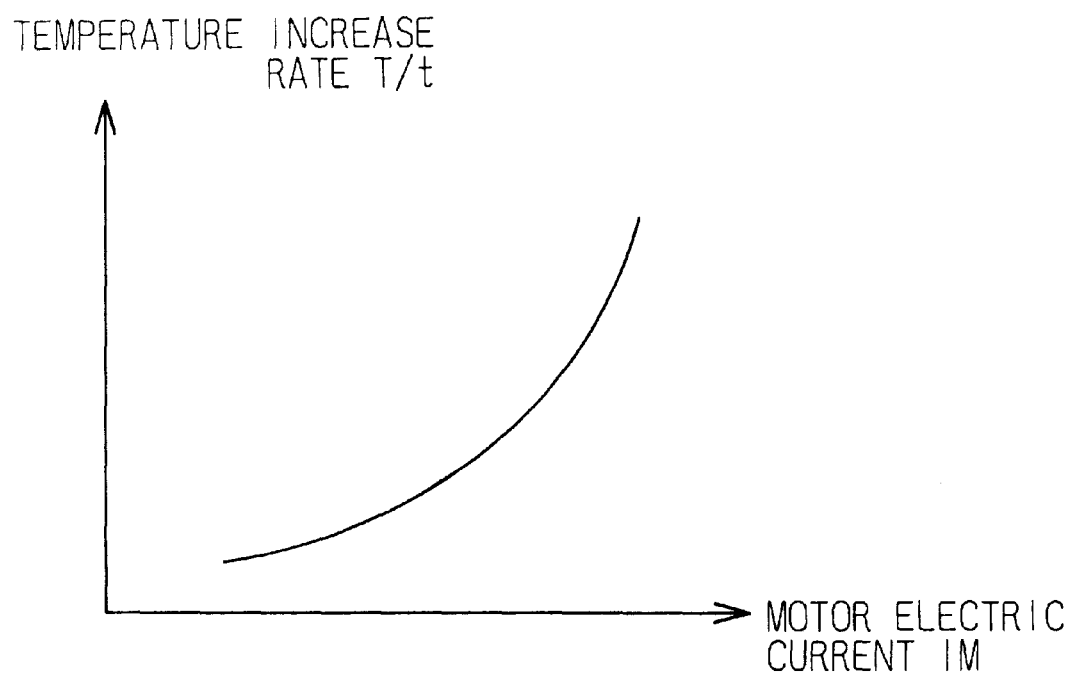
FIG. 3 is a graph showing a relationship between an electric current IM flowing through the electric motor M and a temperature increase rate T/t of a driver element.

FIG. 3 is a graph showing a relationship between an electric current IM flowing through the electric motor M and a temperature increase rate T/t of the driver element 31. The temperature increase rate T/t tends to increase generally proportionally to the square of the electric current IM flowing through the electric motor M as shown in FIG. 3.

The ROM stores therein mapped data indicative of the relationship between the electric current IM flowing through the electric motor M and the temperature increase rate T/t of the driver element 31 per unit time with respect to the temperature of the oil.

Since the temperature increase rate T/t of the driver element 31 is determined by the heat capacity of the entire oil-cooling system including the electric motor M, the driver element 31, the heat sink 26a, the oil pump 26 and the like, data experimentally obtained with the electric motor M and the oil pump 26 being integrally incorporated in the steering mechanism 1 is stored in the ROM.

Figure 4:
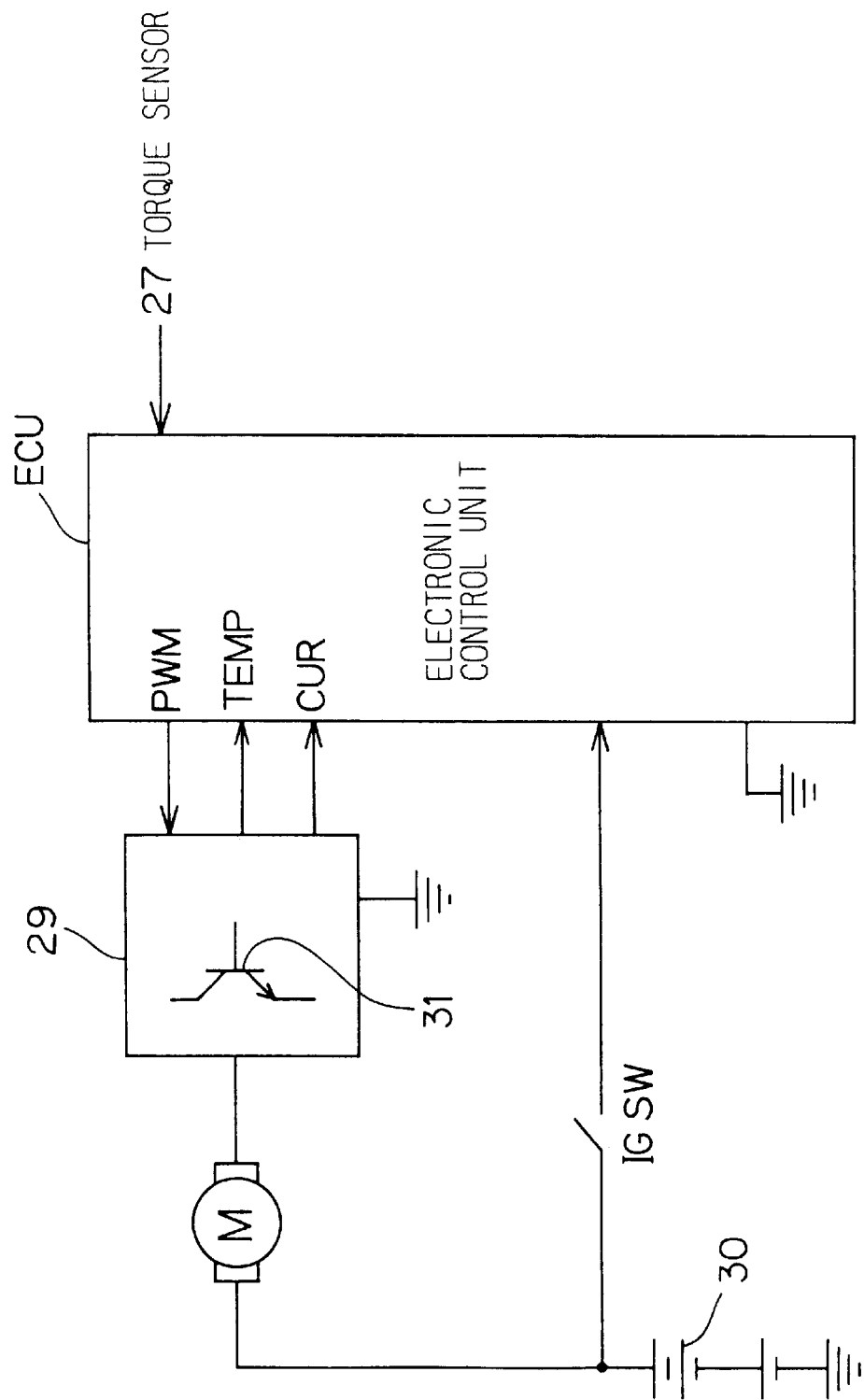

FIG. 4 is a diagram illustrating electrical interconnection of the electronic control unit ECU and the like. The electronic control unit ECU receives the torque signal applied thereto from the torque sensor 27. Further, a temperature detection signal of the driver element 31 in the driving circuit 29 is inputted to the electronic control unit ECU. The temperature of the driver element 31 is sensed by a thermistor or the like incorporated in the driving circuit 29.

Power is supplied to the electric motor M from a battery 30 of the vehicle through the driving circuit 29. The driving circuit 29 is a circuit which generates a driving signal pulse-width-modulated at a duty ratio instructed by the electronic control unit ECU. The level of the electric current flowing through the electric motor from the driving circuit 29 is sensed and inputted to the electronic control unit ECU.

The electronic control unit ECU controls the driving circuit 29 on the basis of the torque signal applied from the torque sensor 27 and the temperature signal of the driver element 31.

Figure 5:
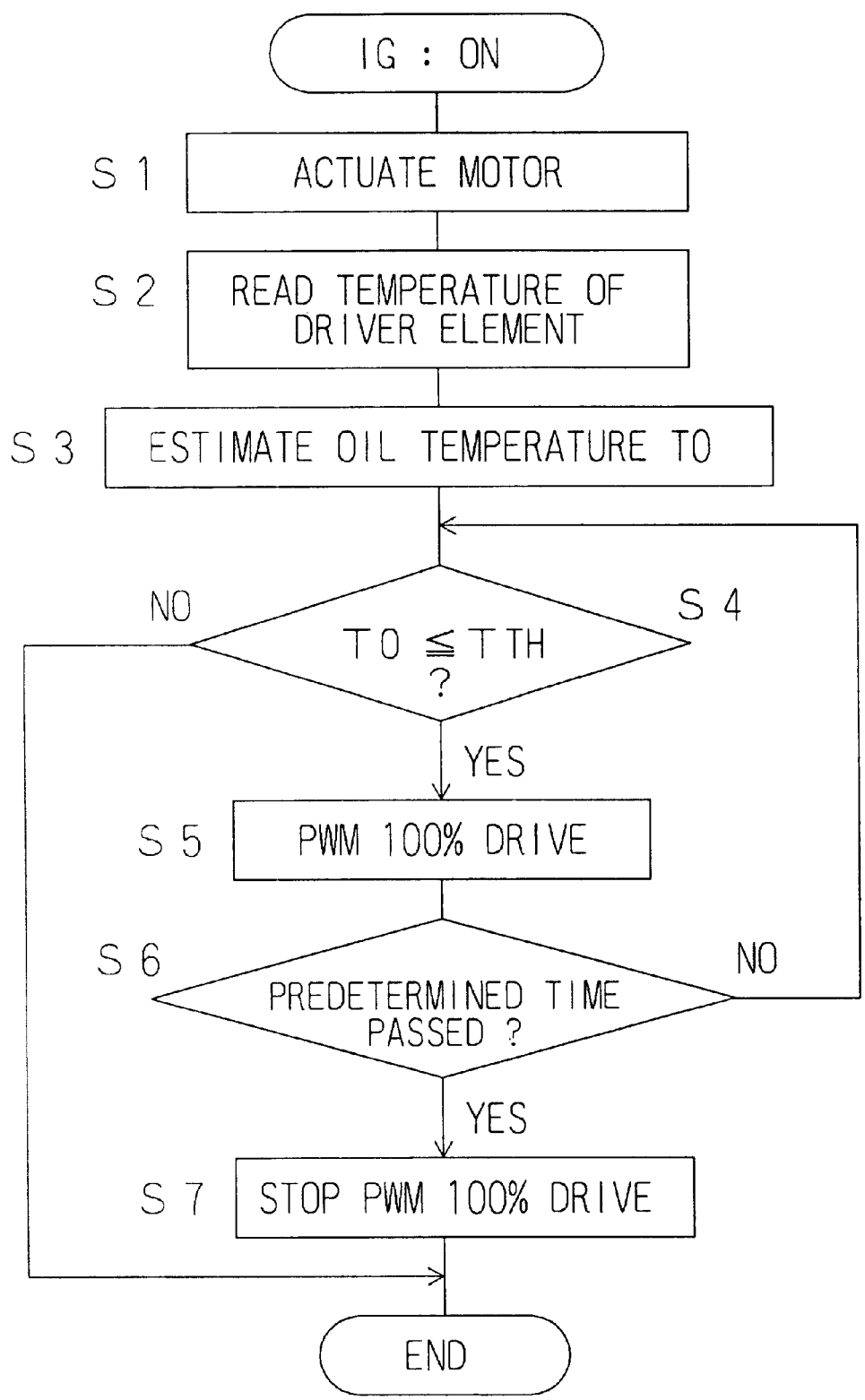
FIG. 5 is a flow chart for explaining an electric motor drive control to be performed by the electronic control unit ECU.

FIG. 5 is a flow chart for explaining a drive control to be performed by the electronic control unit ECU at actuation of the electric motor.

An ignition switch (IG) is turned on to actuate an engine and, in response thereto, the electronic control unit ECU starts driving the electric motor M at a predetermined duty ratio according to the magnitude of the steering torque (Step S1). As a result, the oil pump 26 is actuated, so that the working oil is circulated through the oil circulation line 24.

If the ambient temperature is not low at this time, the temperature of the working oil speedily rises, permitting the oil pump to operate without any problem. If the ambient temperature is low, conversely, the temperature of the working oil does not speedily rise, so that the working oil still has a high viscosity resistance.

In this drive control process, the electronic control unit ECU reads the temperature of the driver element 31 applied from the driving circuit 29 (Step S2), and searches the aforesaid data table (see FIG. 3) in the ROM to estimate an oil temperature To (Step S3).

An explanation will be given to this estimation method. Assuming that an initial level of the oil temperature To is equal to the temperature of the driver element 31, a temperature increase rate T/t corresponding to the electric current IM flowing through the electric motor M is read out of the ROM over time. Then, a temperature rise value DT at the present time point is determined as a cumulative temperature rise rate T/t (obtained by integration with respect to time). With the present temperature rise value DT thus determined, the oil temperature can be estimated from the following expression:

(Oil temperature estimate)=(Present temperature of driver element)−(Present temperature rise value DT)

If it is judged that the oil temperature is equal to or lower than a threshold TTH (YES in Step S4), it is determined that the working oil has a high viscosity resistance, and the electric motor M is driven at a duty ratio of 100% (Step S5). More specifically, the electric motor M which has been driven at a predetermined duty ratio lower than 100% for idling rotation or assist rotation is driven at the full speed to circulate the working oil through the oil circulation line 24 for speedy increase of the oil temperature. The 100% driving is sustained for a predetermined time period (e.g., 2 seconds) (Step S6). After a lapse of the predetermined time period, the 100% driving is stopped (Step S7). This prevents seizing up of the electric motor and damage on the driver element 31 which may otherwise occur due to long-time driving.

Although the electric motor M is driven at a duty ratio of 100% in Step S5 of this process, the duty ratio is not necessarily limited to 100% as long as the electric motor can be rotated at a relatively high speed.

On the other hand, if it is judged in Step S4 that the oil temperature To is higher than the threshold TTH, it is determined that the viscosity resistance of the working oil has become sufficiently low whereby the aim has been achieved. Then, the process ends.

In the power steering apparatus according to this embodiment, where the working oil has a relatively high viscosity resistance, the electric motor M is kept driven until the viscosity resistance reaches a low level. Therefore, the electric motor M can smoothly be driven even at an extremely low temperature. Thus, even if the steering operation is not performed for a long time during the traveling of the vehicle, an entrapped feeling can be prevented when the steering operation is next performed. Therefore, the power steering apparatus ensures a good steering performance.

Another embodiment of the present invention will next be described.

In this embodiment, a reverse connection prevention FET which is not a driver element but an element adapted to shut off the current flow when the battery connection is wrong in polarity is taken into consideration in addition to a three-phase AC drive FET as the driver element in the driving circuit 29. Conventionally, these elements respectively require temperature sensors for monitoring their temperatures, because they have different temperature increase curves depending on operating conditions as shown below:

(a) At 100% PWM driving
Temperature increase of reverse connection prevention FET<Temperature increase of drive FET
(b) At lower than 100% PWM driving
Temperature increase of reverse connection prevention FET>Temperature increase of drive FET In this embodiment, the temperature of only one of the elements is monitored, and the temperature increase rates of the respective elements with respect to an ambience are mapped as a function of the electric motor current IM and stored as map data. The temperatures of the respective elements are estimated by computing the temperature rise values of the respective elements with the use of a single temperature sensor. The ambience may herein be any object which is kept in common thermal contact with the respective elements, for example, a package of the elements, the heat sink 26a or the working oil. It is herein assumed that the heat sink is selected as the ambience.

A more specific explanation will hereinafter be given to this case.

(1) Where a temperature sensor is attached to the reverse connection prevention FET, the temperature of the heat sink is estimated as (Measured temperature of reverse connection prevention FET)−(Calculated value of temperature rise of reverse connection prevention FET), and the temperature of the drive FET is estimated as (Estimated temperature of heat sink)+(Calculated value of temperature rise of drive FET).

Therefore, the temperature of the drive FET can be estimated as (Measured temperature of reverse connection prevention FET)−(Calculated value of temperature rise of reverse connection prevention FET)+(Calculated value of temperature rise of drive FET) on the basis of the stored map data and the measured temperature of the reverse connection prevention FET.

(2) Where a temperature sensor is attached to the drive FET, the temperature of the heat sink is estimated as (Measured temperature of drive FET)−(Calculated value of temperature rise of drive FET), and the temperature of the reverse connection prevention FET is estimated as (Estimated temperature of heat sink)+(Calculated value of temperature rise of reverse connection prevention FET).

Therefore, the temperature of the reverse connection prevention FET can be estimated as (Measured temperature of drive FET)−(Calculated value of temperature rise of drive FET)+(Calculated value of temperature rise of reverse connection prevention FET) on the basis of the stored map data and the measured temperature of the drive FET.

(3) Where a temperature sensor is attached to the heat sink, the temperature of the drive FET is estimated as (Measured temperature of heat sink)+(Calculated value of temperature rise of drive FET), and the temperature of the reverse connection prevention FET is estimated as (Measured temperature of heat sink)+(Calculated value of temperature rise of reverse connection prevention FET).

In this case, the temperatures of the drive FET and the reverse connection prevention FET can be estimated with the use of a single temperature sensor.

Thus, means for protection of an element which is likely to reach its upper limit temperature at the earliest can be selected on the basis of the estimated temperatures of the respective elements. For example, when one element reaches its upper limit temperature at the earliest, the electric motor is deactuated to lower the power steering function even if the other element does not reach its upper limit temperature.

While the embodiments of the present invention have thus been described, it should be understood that the invention be not limited to these embodiments. Although the aforesaid embodiment aims at estimating the temperatures of the drive FET and the reverse connection prevention FET, the invention is applicable to the following case. Where a plurality of drive FETs are provided as driver elements, the temperature of only one of the drive FETs may be monitored, so that the temperature increase rates of the other drive FETs with respect to the ambience are mapped as functions of the electric motor current IM and stored as map data. Besides, various modifications may be made within the scope of the present invention.

What is claimed is:

1. A power steering apparatus for assisting a steering operation by a hydraulic pressure generated by driving an oil pump by an electric motor, the apparatus comprising:

temperature sensing means for sensing a temperature of a driver element operative for driving the electric motor;

electric current sensing means for sensing an electric current flowing through the electric motor;

storage means for storing therein a relationship between the electric current flowing through the electric motor and a temperature increase rate which corresponds to the amount of heat generated in the driver element per unit time by the electric current; and computing means for determining a temperature rise value with respect to an oil temperature as a sum of temperature increase rates each determined with respect to the electric current sensed by the electric current sensing means on the basis of the relationship stored in the storage means, and estimating the oil temperature on the basis of the determined temperature rise value and the temperature of the driver element sensed by the temperature sensing means.

2. A power steering apparatus for assisting a steering operation by a hydraulic pressure generated by driving an oil pump by an electric motor, the apparatus comprising:

temperature sensing means for sensing a temperature of one of a plurality of elements in an electric motor driving circuit or a temperature of an ambience;

electric current sensing means for sensing an electric current flowing through the electric motor;

storage means for storing therein relationships between the electric current flowing through the electric motor and temperature increase rates which correspond to the amounts of heat generated in the respective elements per unit time by the electric current;

computing means for determining temperature rise values of the respective elements as sums of temperature increase rates each determined with respect to the electric current sensed by the electric current sensing means on the basis of the relationships stored in the storage means, and estimating temperatures of the respective elements on the basis of the determined temperature rise values and the temperature sensed by the temperature sensing means; and element protecting means for protecting the respective elements on the basis of the temperatures of the respective elements estimated by the computing means.

* * * * *